(12) United States Patent
Young (10) Patent No.: US 11,309,157 B2
(45) Date of Patent: Apr. 19, 2022

(54) "SAVUS" A SIMPLE, LOW COST EMERGENCY HOME POWER CONNECTION (71) Applicant: Gordon Young, Salt Lake City, UT (US)

(72) Inventor: Gordon Young, Salt Lake City, UT (US)

( * ) Notice: Subject to any disclaimer, the term of this patent is extended or adjusted under 35 U.S.C. 154(b) by 0 days.

(21) Appl. No.: 15/829,679

(22) Filed: Dec. 1, 2017

(65) Prior Publication Data

US 2018/0174790 A1 Jun. 21, 2018

Related U.S. Application Data (60) Provisional application No. 62/497,763, filed on Dec. 2, 2016.

(51) Int. Cl.
| | |
|---|---|
| *H01H 71/74* | (2006.01) |
| *H01H 71/02* | (2006.01) |
| *H01H 9/22* | (2006.01) |
| *H01H 9/54* | (2006.01) |
| *H01H 71/66* | (2006.01) |
| *H01H 9/20* | (2006.01) |
| *H01H 9/26* | (2006.01) |
| *H02J 9/04* | (2006.01) |
| *H01H 9/28* | (2006.01) |

(52) U.S. Cl.
CPC ............. *H01H 71/74* (2013.01); *H01H 9/20* (2013.01); *H01H 9/22* (2013.01); *H01H 9/54* (2013.01); *H01H 71/0264* (2013.01); *H01H 71/66* (2013.01); *H01H 9/262* (2013.01); *H01H 9/286* (2013.01); *H01H 2300/018* (2013.01); *H02J 9/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,855,871 B2 * | 12/2010 | Hudgins, Jr | ............... | H02J 9/06 361/624 |
| 2006/0131146 A1 * | 6/2006 | Filippenko | ............... | H01H 9/26 200/50.33 |
| 2010/0038966 A1 * | 2/2010 | Espeut, Jr. | ............... | H01H 9/26 307/68 |
| 2015/0316595 A1 * | 11/2015 | Creekmore | ............ | G01R 21/06 324/103 R |

* cited by examiner

*Primary Examiner* — Daniel Cavallari
(74) *Attorney, Agent, or Firm* — Paul C. Oestreich; Eminent IP, P.C.

(57) ABSTRACT

The embodiments of a "SAVUS" disclosed herein are simple, safe, low cost devices used to connect emergency power to an entire home. The embodiments of SAVUS are configured to install into most residential types of circuit breaker front panels and require only one available circuit breaker space for installation. SAVUS mechanically interlocks with the main circuit breaker and will not allow connection of an external power source to the circuit breaker box until utility power is turned off for safety.

14 Claims, 6 Drawing Sheets

"SAVUS" A SIMPLE, LOW COST EMERGENCY HOME POWER CONNECTION

CROSS-REFERENCE TO RELATED APPLICATIONS

This non-provisional patent application claims priority from U.S. provisional patent application No. 62/497,763 filed Dec. 2, 2016.

STATEMENT REGARDING FEDERALLY SPONSORED RESEARCH OR DEVELOPMENT

Not applicable.

BACKGROUND OF THE INVENTION

Field of the Invention

This invention relates to a safe, temporary, secure electrical connection between an emergency power source for residences and a conventional circuit breaker enclosure or load center located in the residence to supply power to the entire residence or other load.

Description of Related Art

Long term power outages occur due to severe storms, range fires, earthquakes and other disasters but because they do not occur often, residents do not choose to install costly, complex emergency power sources such as permanent automatic power generators and transfer switches. These permanent emergency power sources often require utility interaction and complex permitting processes as well as considerable cost running wires and drilling holes in internal and external walls. Other present solutions offer units which plug into the utility meter base offering a generator switching connection at that point and also require full utility approval and participation. This utility participation is required to remove the utility meter temporarily while the unit is installed in the meter base and then reconnect it. From previous experience with utility installation interaction, it is often difficult receiving approval and coordinating installations. What is needed is a simple, safe, emergency connection available at low cost for temporary emergency power sources not involving the utility.

Simple connections between a generator, inverter, or other emergency source consisting of a small cable between the source and a wall outlet (known as a "Suicide Cord") are dangerous because of the possibility of back-feeding power to the utility lines and large cumbersome sliding metal plates in the breaker box are used to interlock an auxiliary power connection between the new breakers feeding power from a connection outside of the home and a main breaker. This involves additional external wiring and other home modifications. There is no simple yet safe and low-cost connection like SAVUS designed specifically for emergency use SAVUS is also designed as a simple solution for recent floods, fires, earthquakes and disasters such as the recent Caribbean hurricane in Puerto Rico. The following U.S. patents are representative of the prior art, namely U.S. Pat. No. 8,288,890 to Young (assigned to In Power LLC), U.S. Pat. No. 7,465,892 to Siemens, U.S. Pat. No. 7,449,644 to Siemens, U.S. Pat. No. 7,439,462 to Siemens and U.S. Pat. No. 7,040,920 to Johnson.

SUMMARY OF THE INVENTION

An embodiment of a power connection system for selectively providing auxiliary alternating current (AC) electrical power from an auxiliary AC power source to a load center through a power cable with an auxiliary power cable plug, during auxiliary power mode when utility electrical power is disconnected is disclosed. The embodiment of a system may include a removable module A configured for insertion into a single front panel circuit breaker opening in a load center front panel within a circuit breaker box. The embodiment of module A may further include a front module part configured to be mounted adjacent to a front side of the front panel in front of the breaker opening and selectively covering a connector opening. The embodiment of a front module part may further include an internal sliding plate mounted slidably within the front module part having a long extension arm extending vertically from a left edge and a short extension arm extending vertically from a right edge, the internal sliding plate configured to slide vertically within the front module part to selectively cover the connector opening. The embodiment of module A may further include a rear module part configured to be mounted adjacent to a rear side of the front panel and secured to the front module part with the front panel in between the front and rear module parts. The rear module part may further include a 3-prong socket configured for receiving the power plug from the auxiliary electrical power and connecting to both AC load conductors and neutral conductor. According to this embodiment of the system, module A may be installed within the single front panel circuit breaker opening immediately below the main circuit breaker and its lever.

Another embodiment of a power connection system for selectively providing auxiliary alternating current (AC) electrical power from an auxiliary AC power source to a load center through a power cable with an auxiliary power cable plug, during auxiliary power mode when utility electrical power is disconnected is disclosed. The embodiment of a system may include a removable module A configured for insertion into a single front panel circuit breaker opening in a load center front panel within a circuit breaker box. The embodiment of module A may further include a front module part configured to be mounted adjacent to a front side of the front panel in front of the breaker opening and selectively covering a connector opening. The embodiment of a front module may further include an internal sliding plate mounted slidably within the front module part having a long extension arm extending vertically from a left edge and a short extension arm extending vertically from a right edge, the internal sliding plate configured to slide vertically within the front module part to selectively cover the connector opening. The embodiment of module A may further include a rear module part configured to be mounted adjacent to a rear side of the front panel and secured to the front module part with the front panel in between the front and rear module parts. The embodiment of a rear module part may further include a 3-prong socket configured for receiving the power plug from the auxiliary electrical power and connecting to both AC load conductors and neutral conductor. According to this embodiment of the system, module A may be installed within any single front panel circuit breaker opening.

A SHORT DESCRIPTION OF THE DRAWINGS

Drawings in this application explain the many unique features of the embodiments of the invention disclosed herein.

DISCLOSURE OF PREFERRED EMBODIMENTS OF THE INVENTION

Because SAVUS is designed to fit many circuit breaker enclosures, or circuit breaker boxes, it was determined to find the smallest number of different embodiments which could operate with most circuit breaker enclosures and their circuit breakers. For safety, it is required that it be impossible to connect the emergency power source to the home wiring system until the main circuit breaker is disconnected from utility power.

There are two main embodiments of interconnection systems disclosed and claimed. The first, SAVUS 1, is an intimate direct mechanical contact between the main breaker for smaller loads such as conventional 100-150 Amp main breakers installed in the breaker front panel. The second interconnection, SAVUS 2, is for larger main breakers removed from the location of the many secondary breakers in a typical residence or other load. These main breakers are normally 150-200 Amps. Instead of intimate contact between the main breaker, and the SAVUS Module A, this interconnection is created by an extended mechanical cable push-pull connection. These two systems, SAVUS 1 and 2 are explained in the following paragraphs and how emergency power is kept from Improper connection. There are other means of interface between the emergency input and the main breaker which are possible, but it is believed these two are most desirable. In this document we will refer to these two main breaker location solutions as "SAVUS 1" and "SAVUS 2".

Figure 1:
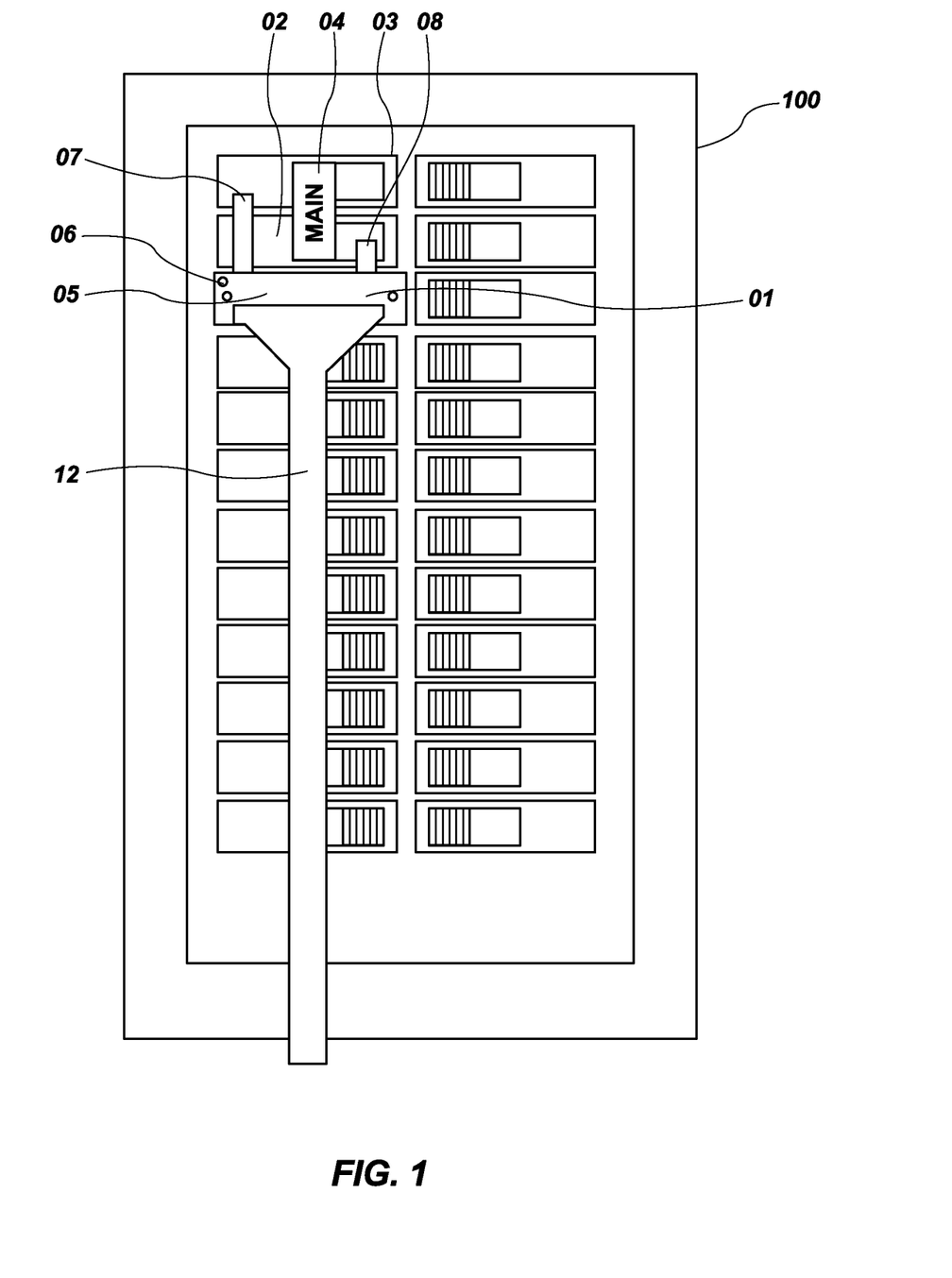
FIG. 1 is a front view diagram of an embodiment of a SAVUS 1 installed within a circuit breaker (or load center) front panel with input power cord.

Referring now to FIG. 1, an embodiment of a SAVUS 1 01 is shown installed in an ordinary circuit breaker box 100 next to the main circuit breaker 02 and including an emergency power cable 12 plugged in. SAVUS 1 is comprised of a Module A and a Module B. Module A is configured to be installed within an ordinary circuit breaker opening within a circuit breaker box 100 including a mechanical connection to the main circuit breaker 02, more particularly, to its associated reset lever 04. Module B is comprised of the secondary (or emergency) power source cable 12 its connector to interface with Module A and an optional power input module 25. Thus, Module A interfaces between the breaker box 100 and Module B. Whereas, Module B interfaces between Module A and the emergency power source (generator, not shown, but generally located outside of building to which power is to be provided.

Because of the SAVUS 1 design, it may be placed above or below the main 100-150 Amp breaker and operate properly anywhere in the box. It has been determined that nearly all residential breakers share the same overall front panel physical size and required panel opening 03 in the front panel. They also share the same size breaker reset lever 04. It is therefore possible to adapt SAVUS 1 to 100-150 Amp breakers available from most circuit breaker manufactures with a single size SAVUS. LED 06 and housing 05 are further explained with reference to FIG. 2B.

Figure 2A:
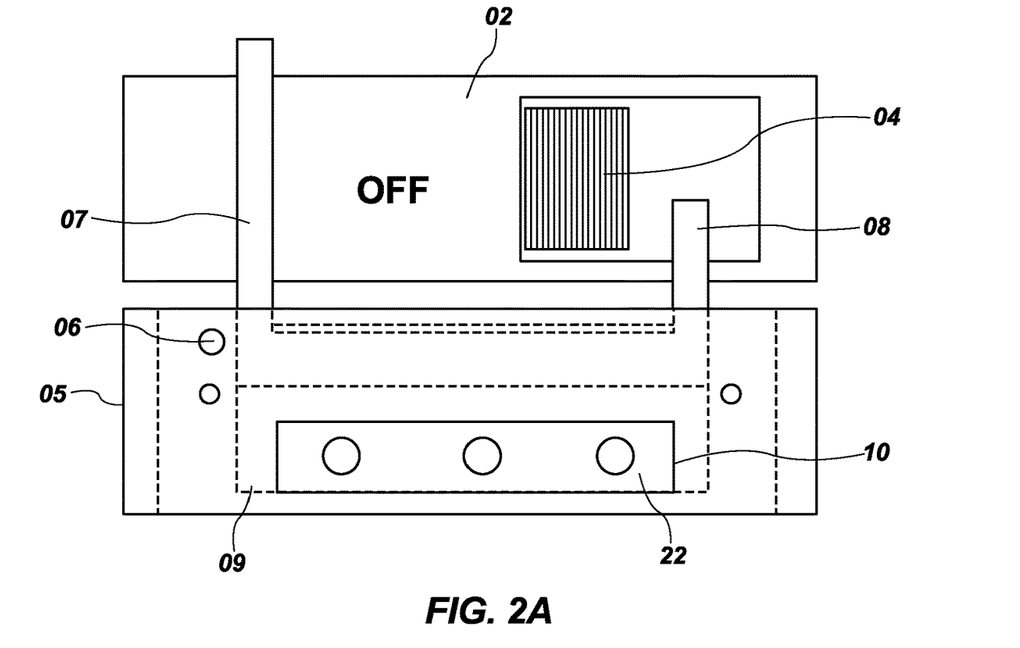
FIG. 2A is a detailed diagram of an embodiment of a SAVUS 1 illustrating the power connector opening in the open position.
Figure 2B:
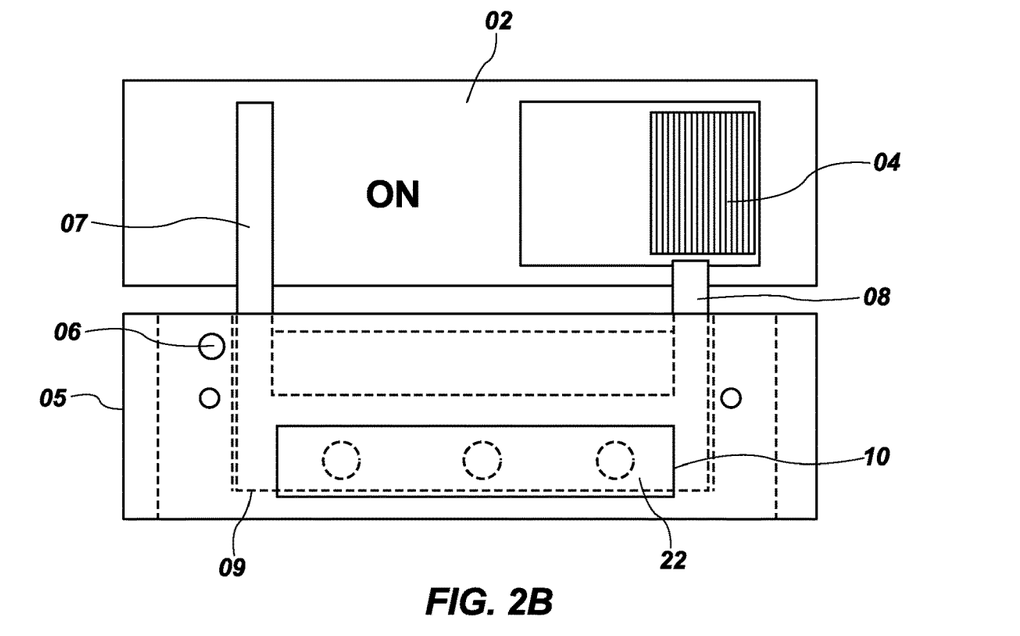
FIG. 2B is a detailed diagram of an embodiment of a SAVUS 1 illustrating the power connector opening in the closed position.

FIG. 2B shows how SAVUS 1 occupies a circuit breaker opening next to the main breaker 02. The module consists of a housing 05, an LED 06 showing when utility power is available, an internal sliding plate 09 opening and closing a connector opening 10 with two extensions, namely longer extension (or handle) 07 and smaller extension 08. When utility power is connected, the smaller extension 08 is not in position to block operation of the main breaker reset lever 04, but the switch lever in the utility position prevents the sliding plate 09 from exposing a power connector within a connector opening 10 (FIG. 2A) beneath the sliding plate 09. When the main breaker reset lever 04 is moved to the "off" position, the now hidden sliding plate 09 can be opened by grasping the extension 07, moving the plate position and opening the way to the formerly hidden three input power connector 22.

FIG. 2A shows sliding plate 09 in the "open" position when the hidden three input connector 22 is available for connection to the emergency power source. When utility power returns as indicated by the LED 06, the emergency power source cable 12 shown in FIG. 1 can be disconnected, the extension 07 grasped and the plate 09 slid back into place blocking the connector opening 10. The main circuit breaker reset switch lever 04 no longer unobstructed by extension 08, may be operated to turn the utility power on via the main circuit breaker 02.

Figure 3:
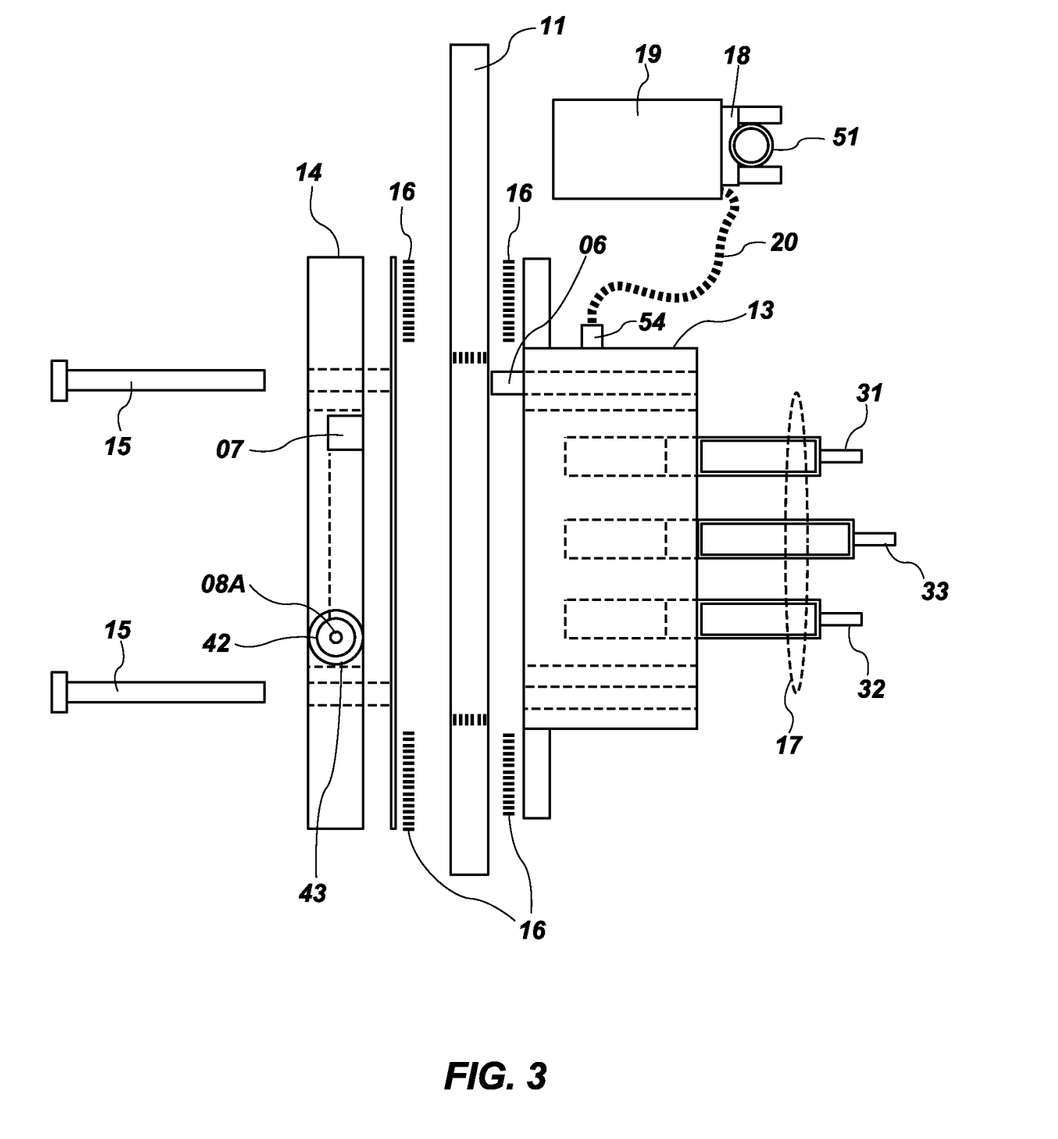
FIG. 3 is an exploded side view of a portion of an installed SAVUS 1 showing attachment detail of an embodiment of a LED "Utility Present" light.

Referring now to the side view of FIG. 3, the SAVUS 1 01 has only three wires 31, 32 and 33 extending from the back side of the load center front panel 11. These three wires 31, 32 and 33 do not connect to any proprietary manufacturer circuit breaker connections such as proprietary rails etc. The SAVUS 1 01 connects only to the front panel 11 with the rear section (or module part) 13 connected to the front housing (or module part) 14 by screws 15. These screws 15 clamp both modules 13 and 14 rigidly to the front panel 11 and held in place securely by rubber gaskets 16 (four gaskets 16 shown in FIG. 3). The three wires 31, 32 and 33 are connected to components inside the breaker box 100 (not shown but see FIG. 1) by a 3-wire connector, shown generally at 17 as a dashed oval, allowing the front panel 11 to be easily removed for breaker maintenance and repair if needed, without disconnecting the SAVUS 1 module from the front panel.

FIG. 3 also shows how the electrically insulated LED 06 can be safely connected to the live utility power 51 ahead of the main switch 02. Because the LED 06 requires only 1 mA of current, a small, high resistance, conductive, fire resistant flexible adhesive plastic foam sheet 18 is adhered to the rear of the front panel with an insulating foam insulator 19, in a manner such that it presses against one side of the bare incoming utility connections 51 to the main breaker box 100. Because of the low conductivity of the plastic piece 19, if misaligned for any reason when the front panel 11 is reattached to the breaker box 100, only a small amount of current can flow even if the compressible foam plastic piece 19 were to be positioned touching both utility legs (wires 31 and 32) at once, (it may be re-positioned) no significant current and therefore heating could occur. A possible material for this foam material could be the black, anti-static plastic foam material used for protecting semiconductors from static charges. This foam 19 is then connected to the LED 06 by high resistance wire 20 and the other side of the AC LED 06 is connected to the center wire 33 of the three conductor connector (or power cable plug) 22 which is connected to neutral in the breaker box 100, thus, lighting the LED 06 when utility power returns and emergency power may then be shut down.

Figure 4:
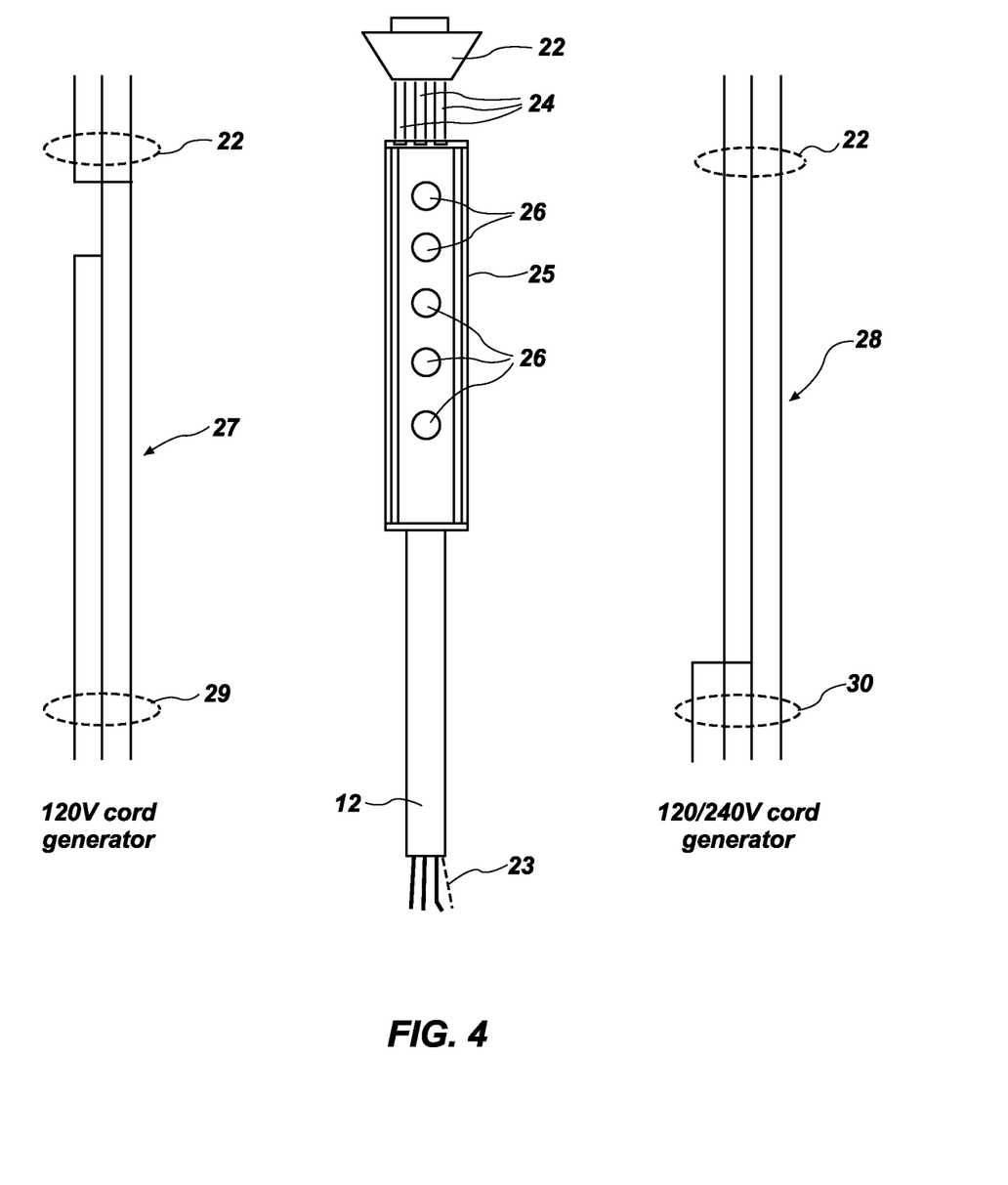
FIG. 4 is a diagram of a structural embodiment of a power cord including a cord power meter and associated wiring diagrams for a 120V and 120V/240V cord embodiments.

FIG. 4 illustrates an embodiment of Module B, namely, an emergency power cord for interfacing between a generator and Module A as installed in a breaker box (not shown in FIG. 4, but see 100, FIG. 1. Because the emergency power cord, or connection, (Module B) is plugged into the front panel of the breaker box 100 (FIG. 1) through the SAVUS 1 01, it is necessary to extend the emergency power cord 12 to the emergency power source (generator, not shown) which must be outdoors in all circumstances where any toxic emissions are present. The cord 12 must then enter through a small, easy to access opening into the building or structure where power is to be provided. Because most connections, or cable connectors 22, able to handle a desirable input are rather large, SAVUS uses a special three terminal approved connector rated for this current such as an Anderson #1327FB-BK. This connector 22 which is only slightly larger (1") than the extended cord 12 (⅝") itself is shown in FIG. 4. The external, or generator, end 23 of Module B connects to a generator plug (not shown) suitable for connection to the emergency power source (generator), which may be a very large connector, while the other end is connected to the small connector using three (or four if 120/240 V configuration) ultra-flexible wires 24. This so wires 24 can easily bend as needed for flexibility and pass through holes in doors and windows for entry. Such holes may be plugged when not needed.

FIG. 4 also shows a cord-based power input device 25 which may be added to the cord 12. This cord-based power input device 25 is an AC ammeter which indicates power output by turning on either single LEDs 26 (5 shown) at various levels, or activating several LEDS in a bar graph (not shown) calibrated in output watts for convenience. Current converted to watts assuming constant voltage output from an emergency source and multiplied by current to determine wattage. The LEDs 26 can be powered by integrated circuits such as an amplified LM 3914 sensing line current through a sensor in various well understood circuits. The purpose of this meter is to give residents an idea of power usage to manage the resource wisely. We believe this will be an additional benefit to users The display, whether just LEDs 26 or bar graph display (not shown) must be small enough in diameter to fit through any openings the small connector must also pass through when the cord 12 is inserted from the outside power source (generator, not shown) and connected to the SAVUS 01 Module A in the breaker box front panel 11. The wiring diagrams 27 and 28 shown to the left and right in FIG. 4 show how emergency power cable 12 can be connected to power cable plug (or connector) 22 and work with either 120 Volt or 120/240 Volt inputs from plugs 29 and 30, respectively.

Figure 5:
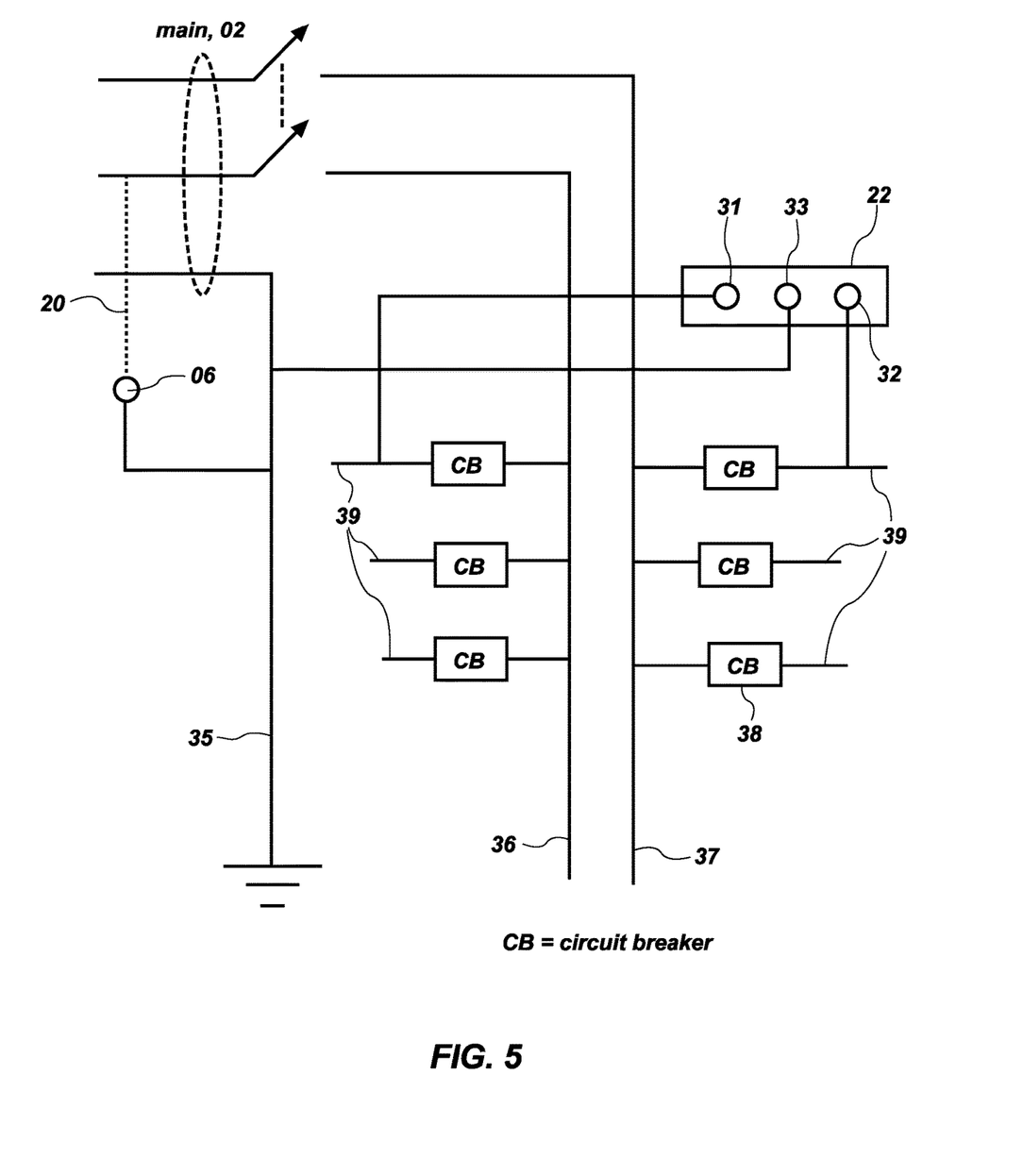
FIG. 5 is an embodiment of an electrical schematic installation diagram.

FIG. 5 shows preferred connection diagram details for the SAVUS 1 01 and SAVUS 2 (see FIG. 6 and related discussion below) units. After the main circuit breaker 02 is opened by the interlock, the three wire connector 22 may be connected either to a 120/240 VAC source with conductors 31 and 32 serving as a single 120 VAC input with conductor 33 remaining as the neutral/ground wire. This alternate line connection is made in the emergency power cable from the power source as shown in FIG. 4. In the circuit breaker box 100, the neutral connection 35 is also grounded serving as an equipment ground to earth, while the input conductors may be connected to the line buses 36 and 37 through either new or present circuit breakers 38. Because most circuit breakers are bidirectional, in most cases input conductors 31 and 32 may be connected to currently existing circuit breakers outputs. In this case, circuit protection is offered by external breakers in the generator to these specific 39 home circuits and no additional breakers are needed for SAVUS 1 or 2. In the event a 120 VAC emergency source is connected to both line buses any 240 VAC loads are automatically disconnected since there is no potential difference between the input leads offering freedom from overloading the power source with these major loads. While various local codes may require minor wiring connection changes from our preferred embodiment, these changes are easily made by minor modifications to our preferred connections.

Figure 6:
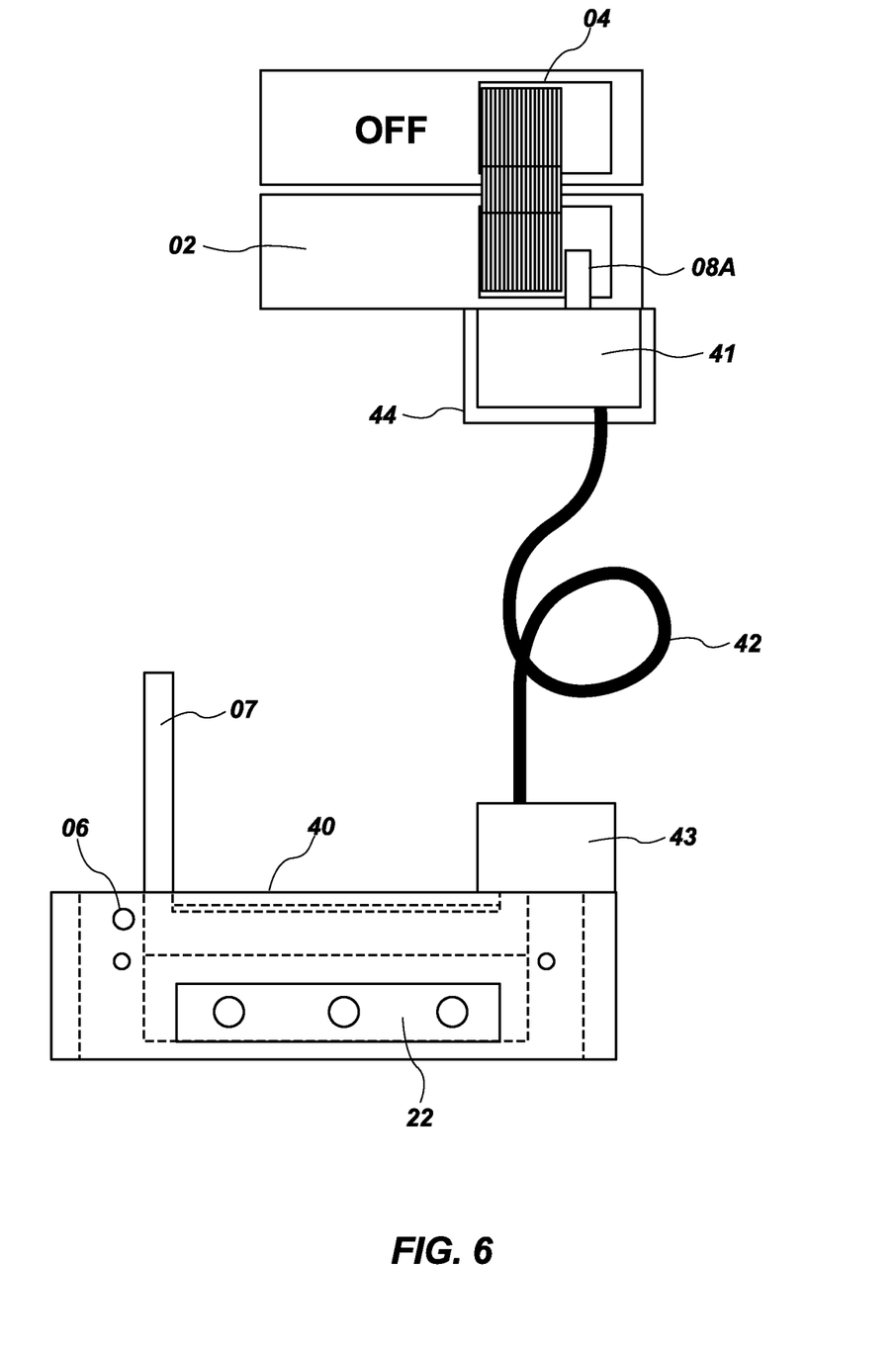
FIG. 6 is a diagram of an embodiment of a SAVUS 2 as it would be connected to a remote main breaker.

FIG. 6 an embodiment of a SAVUS 2, thereby highlighting the differences between SAVUS 1 and SAVUS 2. In the embodiment of a SAVUS 1 shown in FIG. 1, the SAVUS 1 01 Module A has direct physical connection between the Module A and the main circuit breaker 02 for the home insuring that the SAVUS 1 connector cover (sliding plate 09) cannot be opened except when the main breaker 02 is disconnected from utility power. SAVUS 2 offers the same essential characteristic except the secondary circuit breaker connection is not physically touching the main circuit breaker 02 in an interlock arrangement. The SAVUS 2 module is split into two parts 40 and 41. The upper part 41 is connected to the lower part 40 by a mechanical cable connection 42 consisting of a metal wire inside a flexible outer sheath. This metal wire inside a flexible outer sheath 42 is similar to a camera cable release and allows one end to push or pull on the other while maintaining a flexible connection between the two parts 40 and 41. These cables are widely used in many applications such as automotive and industrial controls.

In SAVUS 2 the lower end 40 occupies a circuit breaker opening containing a modified SAVUS 1 Module A including cable connector 43 arranged to push the cable connection 42 upward by grasping the extension 07 and thereby opening the connector door (internal sliding plate 09) to which it is attached instead of the smaller breaker extension piece 08. The upper part, or section, 41 is designed to receive the other end of the cable 42 so that a similar plastic extension 08A may then be pressed into position to block operation of the main circuit breaker 02 to the "ON" position just as the smaller extension piece 08 does in the SAVUS 1 embodiment. This upper module part 41 is secured to front panel 11 next to the main breaker 02 by a large, permanent, contact adhesive pad 44 placed in the proper position. The embodiment of SAVUS 2 can therefore be used with a separate main breaker 02 located away from the many secondary breakers, but still in a fully secure arrangement and adjustable location, adding many more possible installations for SAVUS modules.

The invention claimed is:

1. A power connection system for selectively providing auxiliary alternating current (AC) electrical power from an auxiliary AC power source to a load center through a power cable with an auxiliary power cable plug, during auxiliary power mode when utility electrical power is disconnected, the system comprising:

a removable module A configured for insertion into a single front panel circuit breaker opening in a load center front panel within a circuit breaker box, module A further comprising:
   a front module part configured to be mounted adjacent to a front side of the front panel in front of the breaker opening and selectively covering a connector opening, the front module further comprising:
      an internal sliding plate mounted slidably within the front module part having a long extension arm extending vertically from a left edge and a short extension arm extending vertically from a right edge, the internal sliding plate configured to slide vertically within the front module part to selectively cover the connector opening; and
   a rear module part configured to be mounted adjacent to a rear side of the front panel and secured to the front module part with the front panel in between the front and rear module parts, the rear module part further comprising:
      a 3-prong socket configured for receiving the power plug from the auxiliary electrical power and connecting to both AC load conductors and neutral conductor; and
   wherein module A is installed within the single front panel circuit breaker opening immediately below the main circuit breaker and its lever.

2. The power connection system according to claim 1, wherein during the auxiliary power mode, the internal sliding plate and the smaller extension arm are raised vertically exposing the 3-prong socket through the connector opening for receiving the auxiliary power cable plug and the smaller extension arm physically blocks the main circuit breaker lever from switching from the auxiliary power mode to a utility power mode.

3. The power connection system according to claim 1, wherein the front module part and the rear module part are secured together using screws.

4. The power connection system according to claim 1, wherein rubber gaskets are placed between the front module part and a front side of the load center front panel and rubber gaskets are placed between the rear module part and a rear side of the load center front panel.

5. The power connection system according to claim 1, wherein a user may grasp the long extension arm to vertically raise the internal sliding plate and the smaller extension arm to expose the 3-prong socket through the connector opening for receiving the auxiliary power cable plug and extend the smaller extension arm to physically block the main circuit breaker lever from switching from the auxiliary power mode to a utility power mode.

6. The power connection system according to claim 1, further comprising a light emitting diode (LED) configured to illuminate when in a utility power mode.

7. A power connection system for selectively providing auxiliary alternating current (AC) electrical power from an auxiliary AC power source to a load center through a power cable with an auxiliary power cable plug, during auxiliary power mode when utility electrical power is disconnected, the system comprising:
   a removable module A configured for insertion into a single front panel circuit breaker opening in a load center front panel within a circuit breaker box, module A further comprising:
      a front module part configured to be mounted adjacent to a front side of the front panel in front of the breaker opening and selectively covering a connector opening, the front module further comprising:
         an internal sliding plate mounted slidably within the front module part having a long extension arm extending vertically from a left edge and a short extension arm extending vertically from a right edge, the internal sliding plate configured to slide vertically within the front module part to selectively cover the connector opening; and
      a rear module part configured to be mounted adjacent to a rear side of the front panel and secured to the front module part with the front panel in between the front and rear module parts, the rear module part further comprising:
         a 3-prong socket configured for receiving the power plug from the auxiliary electrical power and connecting to both AC load conductors and neutral conductor; and
   wherein module A is installed within any single front panel circuit breaker opening.

8. The power connection system according to claim 7, further comprising:
   a mechanical cable connection having a remote mechanical interlock at a distal end and a lower end of the mechanical cable connection opposite the distal end;
   wherein the remote mechanical interlock is configured to be mounted adjacent to a main circuit breaker reset lever with a remote extension piece capable of preventing a utility power mode by physically blocking a main circuit breaker reset lever when engaged in the auxiliary power mode; and
   wherein the lower end of a mechanical cable connection is configured to be mounted to the front module part with the short extension arm configured to selectively engage the mechanical cable connection during the auxiliary power mode.

9. The power connection system according to claim 8, wherein during the auxiliary power mode, the internal sliding plate and the smaller extension arm are raised vertically exposing the 3-prong socket through the connector opening for receiving the auxiliary power cable plug and the remote extension arm physically blocks the main circuit breaker lever from switching from the auxiliary power mode to the utility power mode.

10. The power connection system according to claim 7, wherein the front module part and the rear module part are secured together using screws.

11. The power connection system according to claim 7, wherein rubber gaskets are placed between the front module part and a front side of the load center front panel and rubber gaskets are placed between the rear module part and a rear side of the load center front panel.

12. The power connection system according to claim 8, wherein the remote mechanical interlock is mounted adjacent to a main circuit breaker reset lever using a contact adhesive pad.

13. The power connection system according to claim 8, wherein a user may grasp the long extension arm to vertically raise the internal sliding plate and the smaller extension arm to expose the 3-prong socket through the connector opening for receiving the auxiliary power cable plug and extend the smaller extension arm to engage the mechanical cable connection and thereby physically block the main circuit breaker lever from switching from the auxiliary power mode to the utility power mode.

14. The power connection system according to claim 7, further comprising a light emitting diode (LED) configured to illuminate when in a utility power mode.

\* \* \* \* \*